April 10, 1928.

J. BING 1,665,806

METHOD OF AND APPARATUS FOR DISINTEGRATING BULKY SCRAP METAL

Filed Aug. 15, 1925

Inventor:
J. Bing
By Marks & Clerk
Attys

Patented Apr. 10, 1928.

UNITED STATES PATENT OFFICE.

JULIUS BING, OF EISENACH, GERMANY, ASSIGNOR TO THE FIRM MAGNET-WERK G. M. B. H. EISENACH SPEZIAL-FABRIK FÜR ELEKTROMAGNET-APPARATE, OF EISENACH, THURINGIA, GERMANY.

METHOD OF AND APPARATUS FOR DISINTEGRATING BULKY SCRAP METAL.

Application filed August 15, 1925. Serial No. 50,438, and in Germany August 23, 1924.

The methods of and apparatus for disintegrating bulky scrap metal, such as turnings, sheet metal clippings and the like are in general only suitable for dealing with relatively small quantities of scrap. When larger quantities of scrap are to be disintegrated, more particularly such as has been allowed to lie for a considerable time, it is difficult to obtain a satisfactory output from the machines, as it was extremely difficult, if not impossible, to remove the foreign bodies enclosed in the balls of scrap material, which are usually tightly matted together through being allowed to lie for a considerable period, such as solid pieces of metal, pieces of hardened tools and the like, before charging the scrap into the machine. Hitherto this has had to be done by hand. It was consequently necessary to rely on the workmen being particularly conscientious. When the sorting had not been absolutely carefully carried out and where large quantities of scrap had to be dealt with, the work was stopped so frequently, owing to foreign bodies getting into the machine and the safety devices being caused to act, that it was not possible to work machines built for large outputs to anything like their full capacity.

The present invention overcomes this drawback. It has for its object to provide a method of disintegrating bulky scrap metal, in which any foreign bodies of a detrimental kind that may be enclosed in the material to be dealt with are entirely automatically sorted out, so that one is not dependent on the conscientiousness of the workman and the disintegrating machines may be worked to their full capacity.

The method consists more particularly in this, that the disintegrating process is divided into two or more stages, such that in the first place the large solid balls of the scrap metal are unravelled and the foreign bodies thereby exposed, whereupon, after the automatic sorting out of the latter, the disintegration is proceeded with. For this purpose preferably disintegrating machines are used for each stage of the process, which have a passage of such a section that any foreign bodies still contained in the scrap will be of no danger to them.

A further object of the invention is to provide a suitable apparatus for carrying out the method.

Other objects and features of the invention will be described below with reference to the accompanying drawings, which illustrate two constructional examples and in which—

Figure 1:
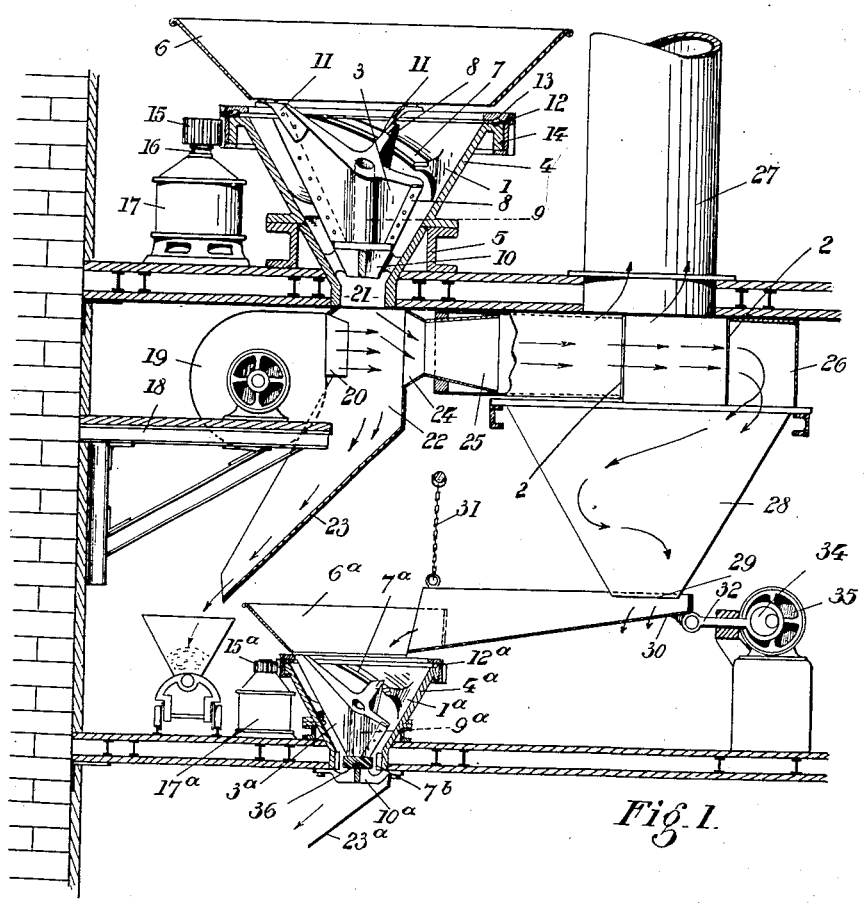
Figure 2:
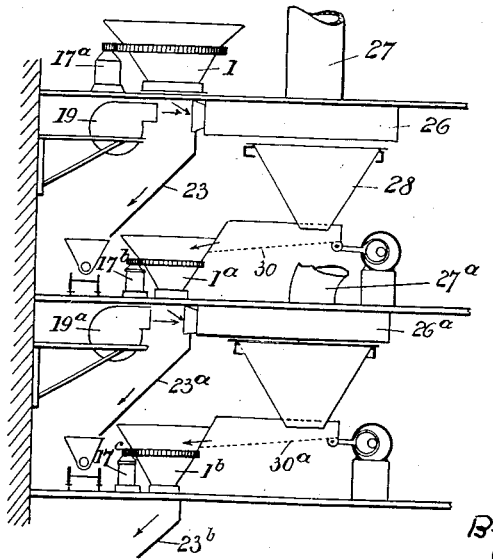

Fig. 1 is a suitable apparatus for carrying out the invention with two disintegrating machines partly in vertical section and partly in elevation, and Fig. 2 shows more diagrammatically a constructional form, in which three disintegrating machines are arranged in series.

Referring to Fig. 1, the apparatus there shown comprises two disintegrating machines 1, $1_a$ located on two stories of a building, one over the other. The disintegrating machines used may for instance be those described in the pending patent application of September 5, 1924, Serial No. 736,089. The disintegrating machines shown in the accompanying drawing differ from those described in the application referred to only in this that the cutter head 3 is driven not from below, but from above.

The disintegrating machines comprise a hopper-like casing 4 resting on the bed plate 5 fixed to the floor of the room. Above the casing a filling hopper 6 may be provided. The inside wall of the casing 4 is provided with ribs arranged helically thereon, to which are fixed helical cutters (stationary cutters) 7. Arranged so as to coact with these stationary cutters 7 are movable cutters 8 mounted on a rotary cutter head 3 or $3_a$ provided with three arms. This cutter head is substantially similarly constructed to that described in the patent application above referred to, so that a detailed description is not required. The cutter head 3 is mounted so as to rotate on a stationary vertical journal 9, which is fixed to a spider 10 positioned in the lower part of the casing 4. Two arms of the cutter head are connected by means of connecting pieces 11, 11 to a ring of teeth 12, which is rotatable with a ball bearing 13 around the upper edge 14 of the casing 4. A toothed pinion 15 meshes with the ring of teeth 12, which pinion is fixed on the vertical shaft 16 of an electric motor 17. The rotary motion is imparted by this motor to the cutter head.

Below the floor supporting the disintegrating machine 1 and on a bracket 18 is a fan 19 which is driven in any suitable manner. The fan delivers at 20 into a shaft 22 forming a continuation of the delivery opening 21 of the disintegrating machine 1, the bottom of which shaft 22 is continued as a chute 23. Opposite the outlet opening 20 of the fan 21 an opening 24 is provided in the shaft 22, to which is connected a pipe 25 which opens into a chamber 26 of large section. To the upper side of this chamber is connected a pipe 27 of large section, the under side of the chamber being connected to a hopper-like casing 28, the lower opening 29 of which lies above the upper end of an inclined vibratory screen 30, which has its other end suspended by means of a chain or the like 31, so as to be capable of swinging, and its upper end connected by a connecting rod 32 to an eccentric 34, which is driven by an electric motor 35. The lower end of the vibratory screen 30 delivers into the hopper 6$_a$ of the second disintegrator 1$_a$, the general arrangement of which is similar to that of the disintegrator 1 described above, so that a detailed description is not required. The disintegrator 1$_a$ is driven by an electric motor 17$_a$ through a pinion 15$_a$ meshing with the ring of teeth 12$_a$ which is fixed to the cutter head of the disintegrator. The disintegrator 1$_a$ differs from the disintegrator 1 only in this, that the distance between the stationary and rotatable cutters is smaller, the lower part of the machine 1$_a$ being preferably provided in addition with a finely disintegrating arrangement consisting of a rotary member 36, similar to a milling cutter, which rotates together with the cutter head 3$_a$ around the vertical journal 9$_a$ and coacts with stationary cutters 7$_b$ provided on the inside of the lower end of the hopper-like casing. For the details of this finely disintegrating arrangement the pending patent application repeatedly mentioned should be referred to. The distances between the operative parts of the cutter head 3 in the machine 1 and the stationary counter cutters or abutments are made such that normally even the largest of the foreign bodies contained in the material to be treated can pass through the machine without disturbing the running thereof, while the distances between the coacting disintegrating members of the machine 1$_a$ are made to correspond to the degree of disintegration desired. The vertical journal 9$_a$ in the machine 1$_a$ is supported by a spider 10$_a$. Below the outlet opening of the casing 4 a chute 23$_a$ is provided, on which the material discharged from the machine is conveyed away.

The apparatus operates in the following manner: The material to be dealt with, for instance turnings collected in turning shops and compressed into balls, is charged into the hopper 6 of the machine 1 without being previously sorted for the removal of solid foreign bodies. In this machine the balls of turnings are partly torn apart and loosened up, so that the solid foreign bodies in them can fall out, while there is also a partial cutting up of the turnings forming the balls. In any case the material after passing through the machine 1 forms a relatively loose mass no longer containing the foreign bodies. Consequently, when the mass falls down past the strong current of air coming from the fan 19, a separation of the turnings proper from the solid foreign bodies can take place, the latter falling down vertically and being finally conveyed away laterally on the chute 23, while the partially disintegrated turnings, as they offer the current of air a considerably greater surface in comparison with their weight, are carried away laterally through the tube 25 into the chamber 26. In this chamber which has a considerably greater section than the connecting pipe 25, the velocity of the current of air diminishes. A change of direction also takes place, the current of air escaping upwardly through the pipe 27. This results in the turnings, which have been carried along by the current of air, falling down into the hopper 28, while only the lighter impurities consisting of dust and the like are carried away by the upwardly escaping current of air. This effect may be assisted by the provision of baffles 2 in the casing 26. At 29 the partially disintegrated and cleaned turnings fall on to the vibratory screen 30, on which they gradually move downwards, more of the dust-like impurities falling through the screen, while the turnings themselves slide into the disintegrator 1$_a$, where they are finally disintegrated in the manner described in the pending patent application repeatedly referred to. In the condition, in which they emerge at the lower end of the hopper-like casing 4 and slide down the chute 23$_a$, they form a valuable, relatively finely broken up material which is consequently in a suitable condition for transport and for being smelted.

As is shown in Fig. 2, more than two disintegrating machines 1, 1$_a$ and 1$_b$ may be placed in series, a separation of the heavy foreign bodies by means of the fan 19, 19$_a$ taking place between each two machines. The separated heavy foreign bodies are completely removed, while the masses of turnings which are blown away by the blast and are separated off in the casings 26, 26$_a$ are subjected, after passing over the screens 30, 30$_a$, to a further disintegration. In that case there is a less complete preliminary disintegration of the balls of turnings in the machine 1. The separate disintegrating machines are so constructed, more particularly as regards the distances between their disintegrating members, that the next following disintegrating machine is not endangered by the foreign bodies allowed to pass through by the preceding separating means.

The separation of the material coming from the preliminary disintegrating machine into the heavy foreign bodies and the other constituents can of course be effected by other blast producing devices than that shown by way of example. The employment of a current of air for separating purposes has the advantage, however, that in this way the dust-like dirt adhering to the disintegrated material is removed, so that a very clean final product is obtained. The depositing or collecting of the turnings and dirt carried along by the current of air escaping from the pipes 27 or 27$_a$ may be effected by any of the known means suitable for this purpose.

What I claim is:—

1. A method of disintegrating scrap metal, more particularly turnings, consisting in this, that the material to be disintegrated is first only partially disintegrated, that the foreign bodies contained in the material, which interfere with the disintegrating process, are separated out by means of a current of a fluid medium and that the disintegration is thereupon completed.

2. A method of disintegrating scrap metal, more particularly turnings, consisting in this, that the material to be disintegrated is first only partially disintegrated, that the foreign bodies contained in the material, which interfere with the disintegrating process, are separated out by means of a blowing device and that the disintegration is thereupon completed.

3. An apparatus for disintegrating scrap metal, more particularly turnings, comprising in combination a primary disintegrating machine, a secondary disintegrating machine, means for transferring the material to be disintegrated from the primary to the secondary disintegrating machine and blast producing means interposed in the path of the material in passing from the primary to the secondary disintegrating machine and capable of separating out a portion of the material from the foreign bodies interfering with the disintegration.

4. An apparatus for disintegrating scrap metal, more particularly turnings, comprising in combination a primary disintegrating machine, a secondary disintegrating machine, means for transferring the material to be disintegrated from the primary to the secondary disintegrating machine, said transferring means comprising a shaft, a casing, a connecting pipe from the shaft to the casing, an outlet pipe of larger effective section than the said connecting pipe and forming a continuation of one side of the said casing, a chamber, in which material can fall down, communicating with the opposite side of the casing and means for producing a current of air delivering into the said shaft opposite the place where the connecting pipe branches off.

5. An apparatus for disintegrating scrap metal, more particularly turnings, comprising in combination a primary disintegrating machine, a secondary disintegrating machine, means for transferring the material to be disintegrated from the primary to the secondary disintegrating machine, said transferring means comprising a shaft, a casing, a connecting pipe from the shaft to the casing, an upwardly directed outlet pipe connected to one side of the casing, a downwardly directed hopper connected to the opposite side of the casing and blast producing means capable of delivering into the said shaft opposite the place where the said connecting pipe branches off.

6. An apparatus for disintegrating scrap metal, more particularly turnings, comprising in combination a primary disintegrating machine, a secondary disintegrating machine, means for transferring the material to be disintegrated from the primary to the secondary disintegrating machine, said transferring means comprising a shaft, a casing, a connecting pipe from the shaft to the casing, an upwardly directed outlet pipe connected to one side of the casing, a downwardly directed hopper connected to the opposite side of the casing, blast producing means capable of delivering into the said shaft opposite the place where the said connecting pipe branches off and a vibratory screen operatively connecting the said hopper and the secondary disintegrating machine, as and for the purpose set forth.

7. A method of disintegrating scrap metal, more particularly turnings, consisting in first tearing apart, loosening and partially cutting up the material, so that the foreign bodies contained in the material, which would interfere with the disintegrating process, are released from the material to be disintegrated, separating said foreign bodies from the material to be disintegrated, and then completing the disintegration of said material.

8. A method of disintegrating scrap metal, more particularly turnings, consisting in first only partially disintegrating the material, removing the material that is to be further disintegrated from the dense foreign bodies originally entangled with it by means of a current of fluid, removing dust and other light foreign matter from the material that is to be further disintegrated by means of the same current of fluid, and then completing the disintegration of said material.

9. A method of disintegrating scrap metal, more particularly turnings, consisting in first tearing apart, loosening and partially cutting up the material, so that the foreign bodies contained in the material, which would interfere with the disintegrating process, are released from the material to be disintegrated, removing the material that is to be further disintegrated from the dense foreign bodies originally entangled with it by means of a current of fluid, removing dust and other light foreign matter from the material that is to be further disintegrated by means of the same current of fluid, and then completing the disintegration of said material.

10. Apparatus for disintegrating scrap metal, more particularly turnings, comprising in combination primary disintegrating means adapted to tear the scrap metal apart, to loosen the fragments so that the foreign bodies contained in the material, which would interfere with the disintegrating process, are released from the material to be disintegrated, and partially to cut up said material, secondary disintegrating means, means for transferring substantially the whole body of the material to be disintegrated from the primary to the secondary disintegrating means, and means interposed between the primary and the secondary disintegrating means for separating from said material the foreign bodies that would interfere with the disintegrating process.

11. Apparatus for disintegrating scrap metal, more particularly turnings, comprising in combination primary disintegrating means, secondary disintegrating means, means for transferring the material to be disintegrated from the primary to the secondary disintegrating means, and means for producing a current of fluid and directing it across the path of the material from the primary to the secondary disintegrating means so as to remove the material that is to be further disintegrated from the dense foreign bodies originally entangled with it and also to remove dust and other light foreign matter from said material.

12. Apparatus for disintegrating scrap metal, more particularly turnings, comprising in combination primary disintegrating means adapted to tear the scrap metal apart, to loosen the fragments so that the foreign bodies contained in the material, which would interfere with the disintegrating process, are released from the material to be disintegrated, and partially to cut up said material, secondary disintegrating means, means for transferring the material to be disintegrated from the primary to the secondary disintegrating means, and means for producing a current of fluid and directing it across the path of the material from the primary to the secondary disintegrating means so as to remove the material that is to be further disintegrated from the dense foreign bodies originally entangled with it and also to remove dust and other light foreign matter from said material.

In testimony whereof I affix my signature.

JULIUS BING.